Patented May 17, 1927.

1,629,013

UNITED STATES PATENT OFFICE.

FRANK V. WEDLOCK, OF CHICAGO, ILLINOIS, ASSIGNOR TO FEATHEREDGE RUBBER COMPANY, INC., A CORPORATION OF ILLINOIS.

CONTINUOUS PROCESS OF PRODUCING SPONGE-RUBBER ARTICLES.

No Drawing.   Application filed July 21, 1925.   Serial No. 45,142.

In the manufacture of sponge rubber articles, it is necessary to use a mold capable of withstanding the internal pressure generated in the rubber during the vulcanizing operation. This has always been a limiting factor on the size of articles made of sponge rubber and has prevented the practical manufacture of sponge rubber strips or the like of any substantial length.

I have found that this difficulty can be overcome if the sponge rubber compound is substantially enclosed in a medium adapted to remove longitudinal strains from the compound and then is moved progressively through a heated zone while held in the desired shape. Such medium preferably is some readily flexible material such as cloth on which strains can be exerted to draw the compound and finished product through a fixed mold or die to which the heat is applied. Preferably the compound is drawn slowly through the heated zone continuously, the speed of movement being so proportioned to the length of the heated zone that the rubber is subjected to the vulcanizing temperature for the proper length of time. Of course, an intermittent movement can be substituted for the continuous movement.

For example, if a strip of sponge rubber of rectangular cross section is desired, a die is used having the interior opening of such cross section. This die is heated in any desired manner, as for example by being placed in an oven, and preferably has end portions extending beyond the heated zone, so that the compound adjacent the heated zone will not be caused to expand unrestrictedly, by the action of radiated heat. A strip of sponge rubber compound of a cross sectional area calculated to fill the die on vulcanization is then wrapped in cloth and drawn through the die, the drawing strain being exerted on the cloth cover. If desired, the cloth may be wrapped completely around the rubber, or, as is simpler in some instances, a narrow slot can be cut in the die and then the cloth is folded about the rubber compound and the two meeting edges of the cloth are allowed to extend out of the die through the slot. As the rubber expands, the pressure will draw into the die sufficient cloth so that the rubber will completely fill the die, the cloth being used simply as the medium for exerting drawing pressure on the rubber during the curing operation.

Under some circumstances it may not be necessary completely to surround the rubber strip with a flexible medium. For example, if a broad flat strip of product is desired, the die can take the form of two flat platens with guide members at the edges. A strip of compound is then prepared substantially the width of the desired product but of less thickness, and this is fed between the platens by the use of a piece of cloth laid under and on top of the rubber strip. Under some circumstances it may be desirable to make the edge guides of material to which the rubber will not adhere, as for example, soapstone. In such a case such a large proportion of the surface of the rubber is covered by the flexible medium that it may be said that the rubber is substantially covered by the flexible medium.

Where it is not desired that the cloth or other flexible medium used shall become part of the finished product, such medium should be prepared in such a way that it will not adhere to the rubber, as for example, by the use of powdered soapstone; whereas if no soapstone is used the finished product will comprise sponge rubber having a flexible cover integrally united to it by vulcanization.

The use of a cloth tube for molding sponge rubber, without the assistance of a die, is claimed in the copending application of Harry M. Hood, Serial No. 45,134, filed July 21, 1925.

What I claim is:

1. The process of producing sponge rubber bodies which comprises the steps of placing a long length of sponge rubber compound between surfacing layers of a medium readily flexible in all directions and drawing said flexible medium, and with it drawing the compound, through a heated zone in the presence of a heated die, whereby said compound is caused progressively to expand and move the surfacing layers of flexible medium to take the shape of the die and whereby the compound is progressively cured into an extended body of sponge rubber having a cross sectional shape corresponding to the shape of the die.

2. The process defined in claim 1, in which the compound in its progressive movement is first drawn into a relatively cool portion of the die and then is drawn into a portion heated to the vulcanizing temperature.

3. A process as defined in claim 1, in which the flexible medium used comprises woven fabric.

4. A process as defined in claim 1, in which the flexible medium is a strip of cloth and the die consists of a rigid tube provided with a slot through which the edges of the strip of cloth extend.

5. As a new article of manufacture, a strip of sponge rubber of uniform cross section, which strip is normally substantially straight and is of a greater length than is feasible to produce in a mold at a single cure and which is produced by drawing sponge rubber compound through a heated die where the same is vulcanized.

6. An article as defined in claim 5 which is further characterized by having a flexible cover united to the rubber by vulcanization and which is non-circular in cross section.

FRANK V. WEDLOCK.